United States Patent
Huang

(10) Patent No.: US 10,282,592 B2
(45) Date of Patent: May 7, 2019

(54) FACE DETECTING METHOD AND FACE DETECTING SYSTEM

(71) Applicant: iCatch Technology, Inc., Hsinchu (TW)

(72) Inventor: Min-Jung Huang, Hsinchu (TW)

(73) Assignee: iCATCH TECHNOLOGY INC. (TW)

( * ) Notice: Subject to any disclaimer, the term of this patent is extended or adjusted under 35 U.S.C. 154(b) by 57 days.

(21) Appl. No.: 15/404,906

(22) Filed: Jan. 12, 2017

(65) Prior Publication Data
US 2018/0196996 A1    Jul. 12, 2018

(51) Int. Cl.
| | | |
|---|---|---|
| G06K 9/00 | (2006.01) | |
| G06F 16/583 | (2019.01) | |
| G06K 9/46 | (2006.01) | |
| H04N 5/232 | (2006.01) | |

(52) U.S. Cl.
CPC ....... *G06K 9/00228* (2013.01); *G06F 16/583* (2019.01); *G06K 9/00986* (2013.01); *G06K 9/4642* (2013.01); *H04N 5/23219* (2013.01)

(58) Field of Classification Search
None
See application file for complete search history.

(56) References Cited

U.S. PATENT DOCUMENTS

| | | | | |
|---|---|---|---|---|
| 5,680,481 A | * | 10/1997 | Prasad | G06K 9/00281 382/118 |
| 9,317,785 B1 | * | 4/2016 | Moon | G06K 9/00234 |
| 2007/0195171 A1 | * | 8/2007 | Xiao | G06K 9/00228 348/207.99 |
| 2008/0123907 A1 | * | 5/2008 | Eura | G06K 9/00288 382/118 |
| 2009/0060344 A1 | * | 3/2009 | Yamazaki | G06K 9/00248 382/195 |
| 2009/0161964 A1 | * | 6/2009 | Tzur | G06K 9/3208 382/203 |
| 2009/0220156 A1 | * | 9/2009 | Ito | G06K 9/00248 382/201 |
| 2009/0316962 A1 | * | 12/2009 | Sun | G06K 9/00248 382/118 |

(Continued)

OTHER PUBLICATIONS

Huang et al. ("High-Performance Rotation Invariant Multiview Face Detection", IEEE Transactions on Pattern Analysis and Machine Intelligence, vol. 29, Nov. 4, 2007.*

*Primary Examiner* — Randolph I Chu
(74) *Attorney, Agent, or Firm* — Innovation Counsel LLP

(57) ABSTRACT

A face detecting method and a face detecting system are provided. The face detecting method includes the following steps: At least one original image block is received. The original image block is transformed by a transforming unit to obtain a plurality of different transformed image blocks. Whether each of the transformed image blocks contains a face is detected by a detecting unit according to only one identical face database and a detecting result value is outputted accordingly. The transformed image blocks are detected by a plurality of parallel processing cores. Whether a maximum of the detecting result values is larger than a threshold value is determined by a determiner. If the maximum of the detecting result values is larger than the threshold value, then the determiner deems that the original image block contains a face.

12 Claims, 7 Drawing Sheets

(56) References Cited

U.S. PATENT DOCUMENTS

| | | | |
|---|---|---|---|
| 2010/0177206 A1* | 7/2010 | Ogawa | G06K 9/00275 348/222.1 |
| 2010/0232657 A1* | 9/2010 | Wang | G06K 9/00275 382/118 |
| 2011/0032378 A1* | 2/2011 | Kaneda | G06K 9/00288 348/222.1 |
| 2012/0070041 A1* | 3/2012 | Wang | G06F 21/32 382/118 |
| 2012/0114250 A1 | 5/2012 | Zhong et al. | |
| 2013/0266193 A1* | 10/2013 | Tiwari | G06K 9/00771 382/115 |
| 2013/0294642 A1* | 11/2013 | Wang | G06F 17/30855 382/103 |
| 2014/0140572 A1 | 5/2014 | Ranjan et al. | |
| 2015/0078629 A1* | 3/2015 | Gottemukkula | G06K 9/0061 382/117 |
| 2016/0335475 A1* | 11/2016 | Krenzer | G06K 9/00335 |
| 2017/0068844 A1* | 3/2017 | Friedland | G06K 9/00973 |
| 2018/0107873 A1* | 4/2018 | Duong | G06K 9/00617 |

* cited by examiner

FACE DETECTING METHOD AND FACE DETECTING SYSTEM

BACKGROUND

Technical Field

The disclosure relates in general to a detecting method and a detecting system, and more particularly to a face detecting method and a face detecting system.

Description of the Related Art

Along with the development of the face detection technology, the face detection has been applied in various devices. For example, the face detection can be used for tracking a focus of a camera, such that the focus of the camera can be moved following the face to clearly shoot the face. Or, the face detection can be used in an interactive game, such that if the user stands in front of the interactive camera, then the user can be detected and the interactive game can be started automatically. Or, the face detection can be used in a monitor to monitor any intruder.

However, the face of the user may be tilted, or only the side face of the user is shot. For detecting the titled face or the side face, several kinds of face databases must be provided. Those face databases are obtained by training several kinds of face photos. Those training procedures are complex and a huge storage space should be required.

SUMMARY

The disclosure is directed to a face detecting method and a face detecting system. A transforming procedure is performed to obtain a clear full-frontal face. Therefore, only one face database is needed in the face detection. The training procedures of other face databases can be omitted and the storage space can be saved.

According to a first aspect of the present disclosure, a face detecting method is provided. The face detecting method includes the following steps: At least one original image block is received. The original image block is transformed by a transforming unit to obtain a plurality of different transformed image blocks. Whether each of the transformed image blocks contains a face is detected by a detecting unit according to only one identical face database and a detecting result value is outputted accordingly. The transformed image blocks are detected by a plurality of parallel processing cores. Whether a maximum of the detecting result values is larger than a threshold value is determined by a determiner. If the maximum of the detecting result values is larger than the threshold value, then the determiner deems that the original image block contains a face.

According to a second aspect of the present disclosure, a face detecting system is provided. The face detecting system includes a transforming unit, only one face database and a detecting unit. The transforming unit is for transforming at least one original image block to obtain a plurality of different transformed image blocks. The detecting unit includes a plurality of parallel processing cores and a determiner. The parallel processing cores are used for detecting whether each of the transformed image blocks contains a face according to the only one identical face database and outputting a detecting result value accordingly. The determiner is for determining whether a maximum of the detecting result values is larger than a threshold value. If the maximum of the detecting result values is larger than the threshold value, then it is deemed that the original image block contains a face.

The above and other aspects of the disclosure will become better understood with regard to the following detailed description of the non-limiting embodiment(s). The following description is made with reference to the accompanying drawings.

DETAILED DESCRIPTION

Several embodiments are disclosed below for elaborating the invention. Those embodiments are for the purpose of elaboration only, not for limiting the scope of protection of the invention. Besides, secondary elements are omitted in the following embodiments to highlight the technical features of the invention.

Figure 1:
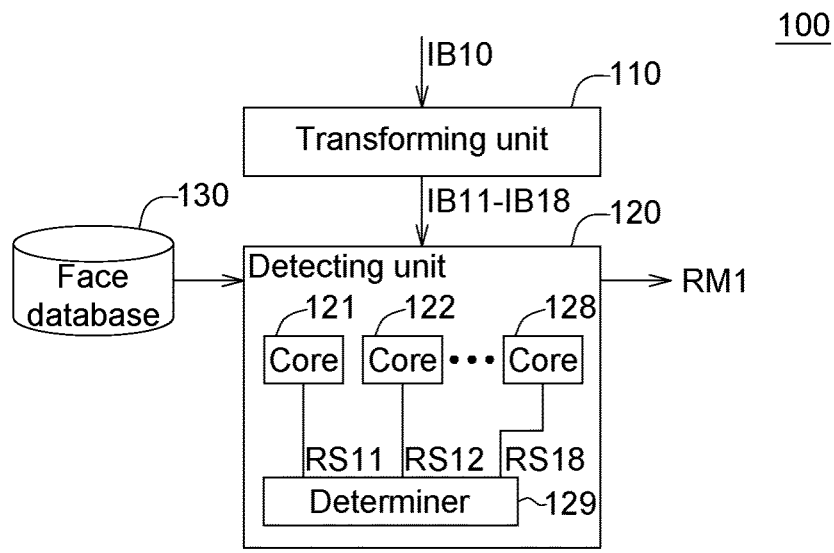
FIG. 1 shows a face detecting system according to one embodiment.

Please refer to FIG. 1, which shows a face detecting system 100 according to one embodiment. The face detecting system 100 may be a camera, a video recorder, a computer, a smart phone or a cloud center. The face detecting system 100 at least includes a transforming unit 110, a detecting unit 120 and only one face database 130. The transforming unit 110 is used for performing some transforming procedures, such as a rotation procedure, an affine transformation procedure, a distortion transformation procedure, a luminosity adjustment procedure, a contrast ratio adjustment procedure or a chromaticity adjustment procedure. For example, the transforming unit 110 may be a circuit, a chip, a circuit board, a storage device storing a plurality of program codes.

The detecting unit 120 includes a plurality of parallel processing cores 121 to 128 and a determiner 129. In one embodiment, the detecting unit 120 including the parallel processing cores 121 to 128 is implemented by a system on chip (SOC) architecture. The detecting unit 120 is used for performing some face detecting procedures. For example, the detecting unit 120 may be a circuit, a chip, a circuit board, a storage device storing a plurality of program codes. In one embodiment, the transforming unit 110 and the detecting unit 120 may be integrated into one piece.

The only one face database 130 is used for storing face features. For example, the face database 130 may be a hard disk, a memory or a memory card.

Figure 2:
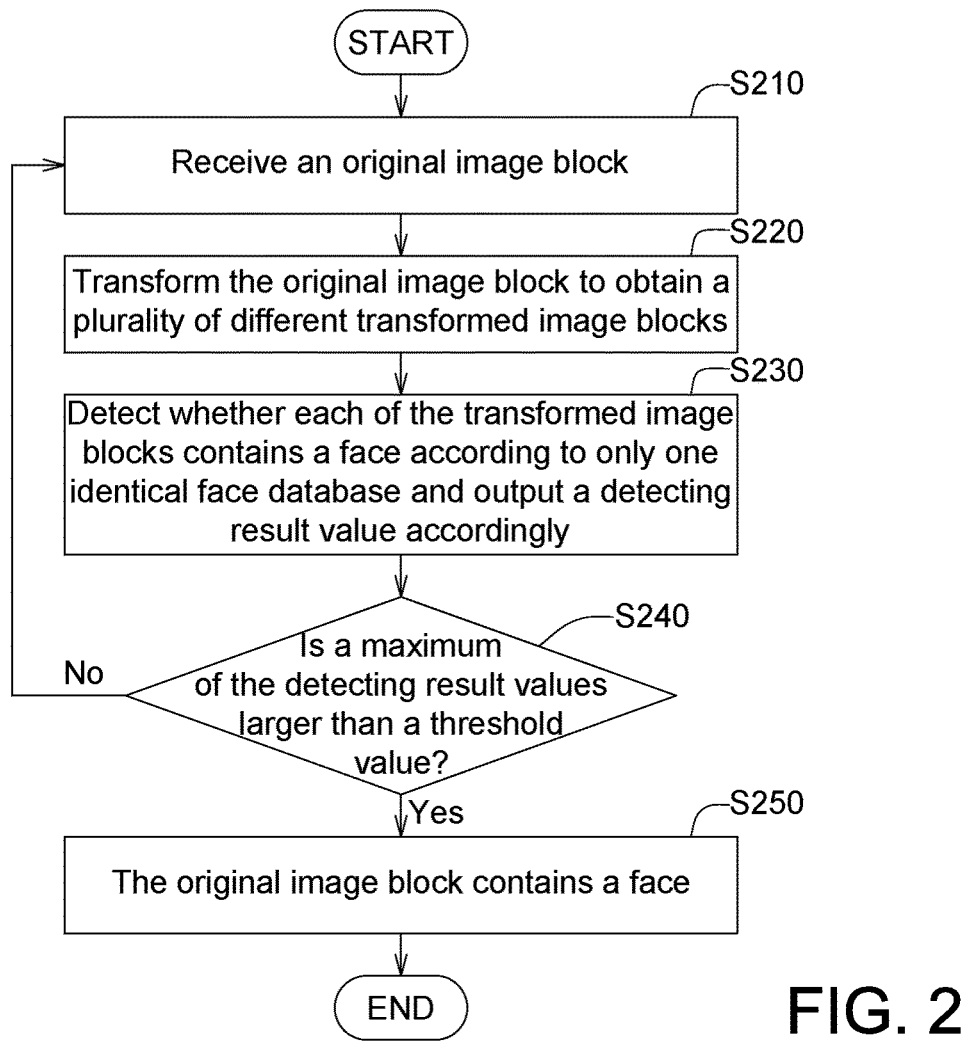
FIG. 2 shows a flowchart of a face detecting method according to one embodiment.
Figure 3:
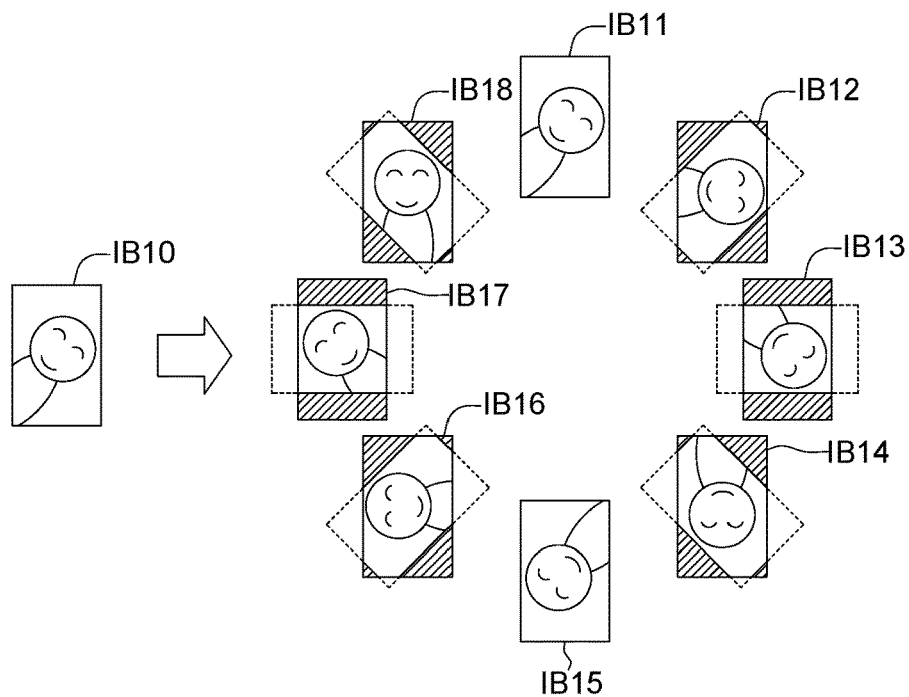
FIGS. 3 and 4 illustrate the steps of FIG. 2.
Figure 4:
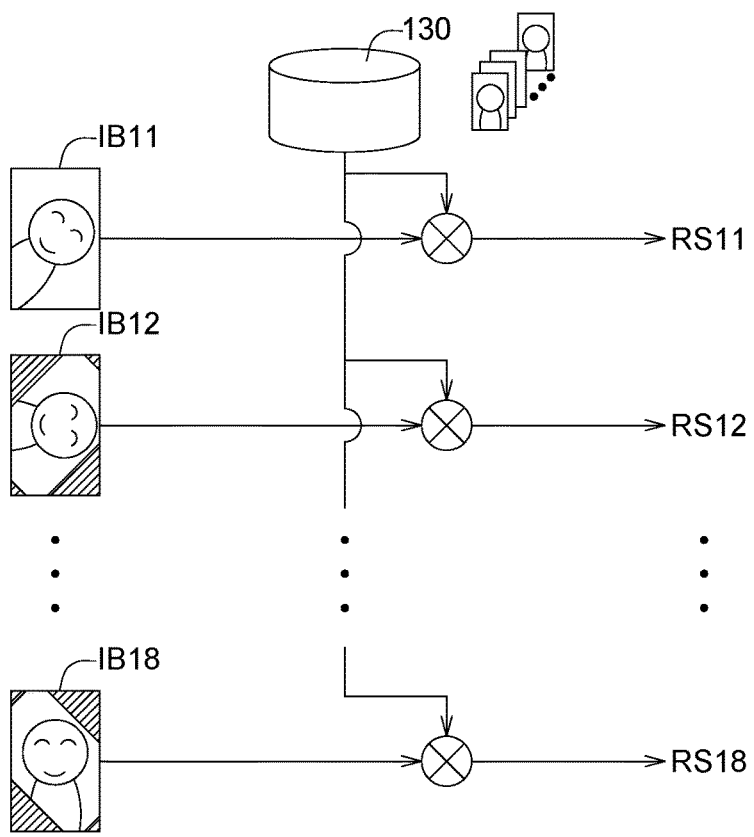

Please refer to FIGS. 2 to 4. FIG. 2 shows a flowchart of a face detecting method according to one embodiment. FIGS. 3 and 4 illustrate the steps of FIG. 2. The operation of the face detecting system 100 will be illustrated with the flowchart of FIG. 2. However, the face detecting method is not limited to be performed by the face detecting system 100 of FIG. 1.

In step S210 of FIG. 2, referring to FIGS. 1 and 3, an original image block IB10 is received by the transforming unit 110. In one embodiment, the original image block IB10 may be a portion of an image or whole of an image.

In step S220 of FIG. 2, referring to FIGS. 1 and 3, the original image block IB10 is transformed to obtain a plurality of different transformed image blocks IB11-IB18 by the transforming unit 110. In this embodiment, the original image block IB10 is rotated, by taking a center point of the original image block IB10 as a rotation axis, at 0, 45, 90, 135, 180, 225, 270 and 315 degrees to obtain 8 different transformed image blocks IB11 to IB18. In other embodiment, the original image block IB0 can be rotated at (360/N)*i degrees to obtain N different transformed image blocks. N is a positive integer which is larger than 2 and i is a positive integer from 0 to N.

Referring to FIG. 3, the face in the original image block IB10 is tilted. By rotating the original image block IB0, the face in the original image block IB10 can be righted in one of the transformed image blocks IB11 to IB18. For example, the face is righted in the transformed image block IB18.

In step S230 of FIG. 2, referring to FIG. 4, whether each of the transformed image blocks IB11 to IB18 contains a face is detected according to the only one identical face database 130 by the parallel processing cores 121 to 128 of the detecting unit 120 and detecting result values RS11, RS12 to RS18 are outputted accordingly. In this step, the transformed image blocks IB11 to IB18 are detected by the parallel processing cores 121 to 128 at the same time.

In step S240, whether a maximum of the detecting result values RS11 to RS18 is larger than a threshold value is determined. If the maximum of the detecting result values RS11 to RS18 is larger than the threshold value, then the process proceeds to step S250; if the maximum of the detecting result values RS11 to RS18 is not larger than the threshold value, then the process returns to the step S210.

In this embodiment, the original image block IB10 is rotated at several degrees. Even if the face in the original image block IB10 is tilted, the face in one of the transformed image blocks IB11 to IB18 can be righted to be a full-frontal face. Therefore, only one identical face database 130 is needed in the step S230. In this embodiment, the face database 130 is a full-frontal face database which contains several full-frontal face features obtained by training several full-frontal face photos.

The parallel processing cores 121 to 128 of the detecting unit 120 detect the transformed image blocks IB11 to IB18 to output several detecting result values RS11, RS12, ..., RS18 respectively. In step S250, the maximum of the detecting result values RS11 to RS18 is larger than the threshold value, such as 0.8, then it is deemed that the original image block IB10 contains a face.

In the example of FIG. 4, the detecting result values RS11, RS12, ..., RS18 are 0.6, 0.4, 0.2, 0.1, 0.2, 0.4, 0.6, and 0.9. Because the face is righted in the transformed image block IB18, the detecting result value RS18 is the maximum. The detecting result value RS18 is larger than the threshold value, therefore it is deemed that the original image block IB10 contains the face.

Figure 5:
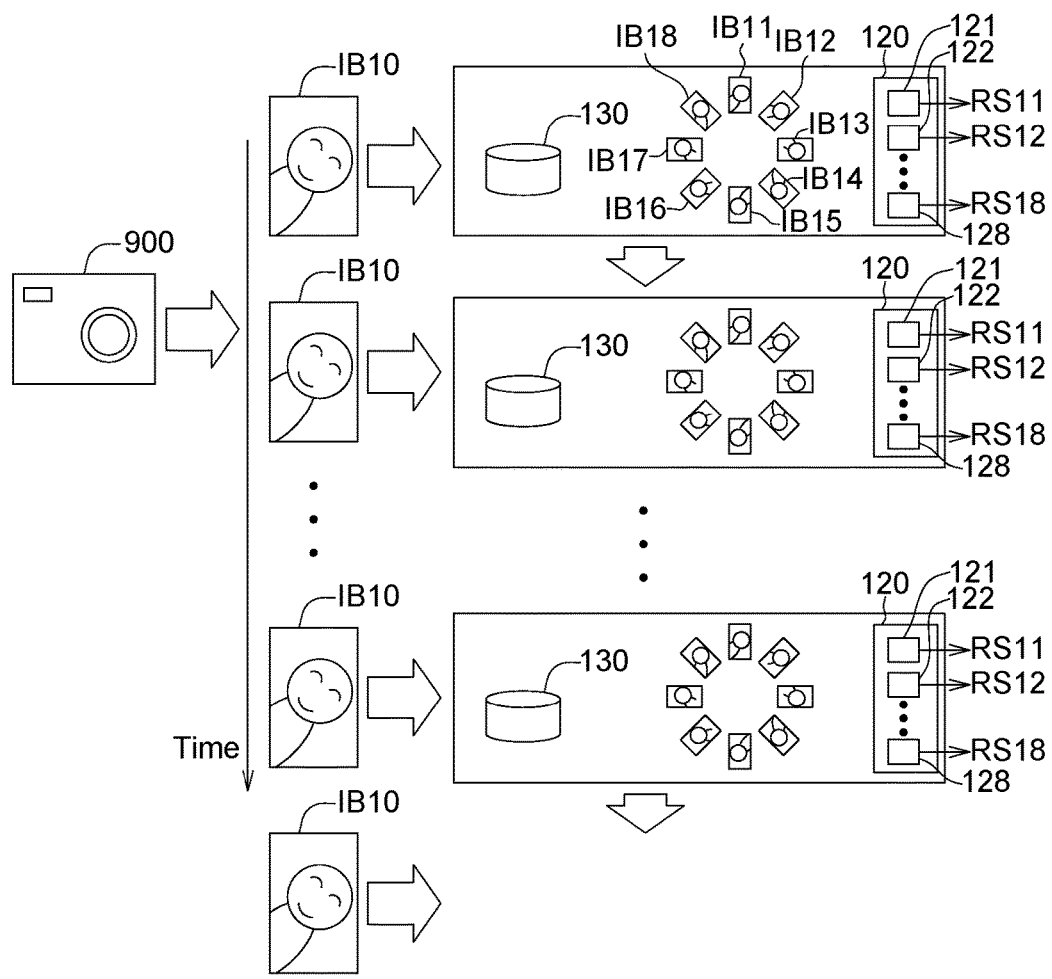
FIG. 5 shows a parallel process for the face detecting method according to one embodiment.

Refer to FIG. 5, which shows a parallel process for the face detecting method according to one embodiment. A camera 900 captures a series of original image blocks IB10 along with time series. Those original image blocks IB10 are transformed to be the transformed image blocks IB11 to IB18 and then the transformed image blocks IB11 to IB18 are detected to find a face. In the face detecting method, the time consumption of the step of detecting is larger than the time consumption of the step of transforming.

For reducing the time consumption, the step of detecting the transformed image block IB11 to IB18 can be respectively performed by the parallel processing cores 121 to 128 at the same time. Therefore, the processing efficiency can be greatly improved.

Referring to FIG. 1, a result message RM1 shown that it is deemed that the original image block IB10 contains a face is outputted. In one example, the result message RM1 can be used for tracking a focus of a camera, such that the focus of the camera can be moved following the face to clearly shoot the face. Or, the result message RM1 can be used in an interactive game, such that if the user stands in front of the interactive camera, then the user can be detected and the interactive game can be started automatically. Or, the result message RM1 can be used in a monitor to monitor any intruder.

Base on above, by transforming the original image block IB10, only one identical face database 130 is needed in the face detecting method. Therefore, the training procedures of other face databases can be omitted and the storage space can be saved.

Figure 6:
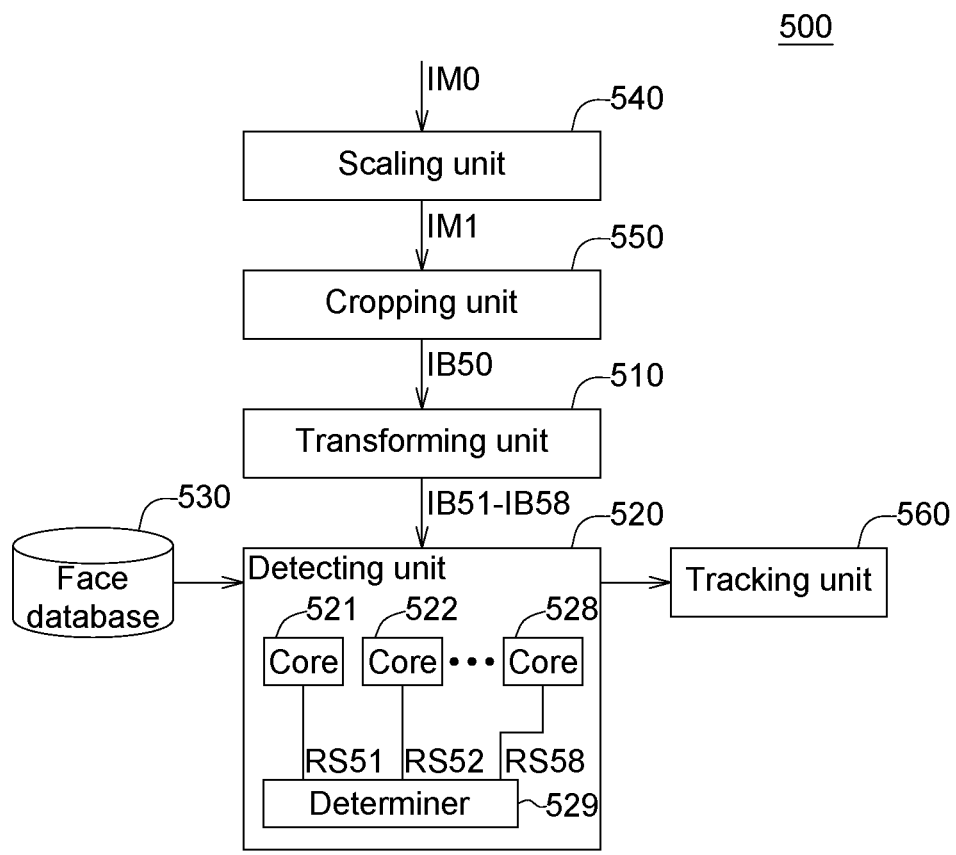
FIG. 6 shows a face detecting system according to another embodiment.
Figure 7:
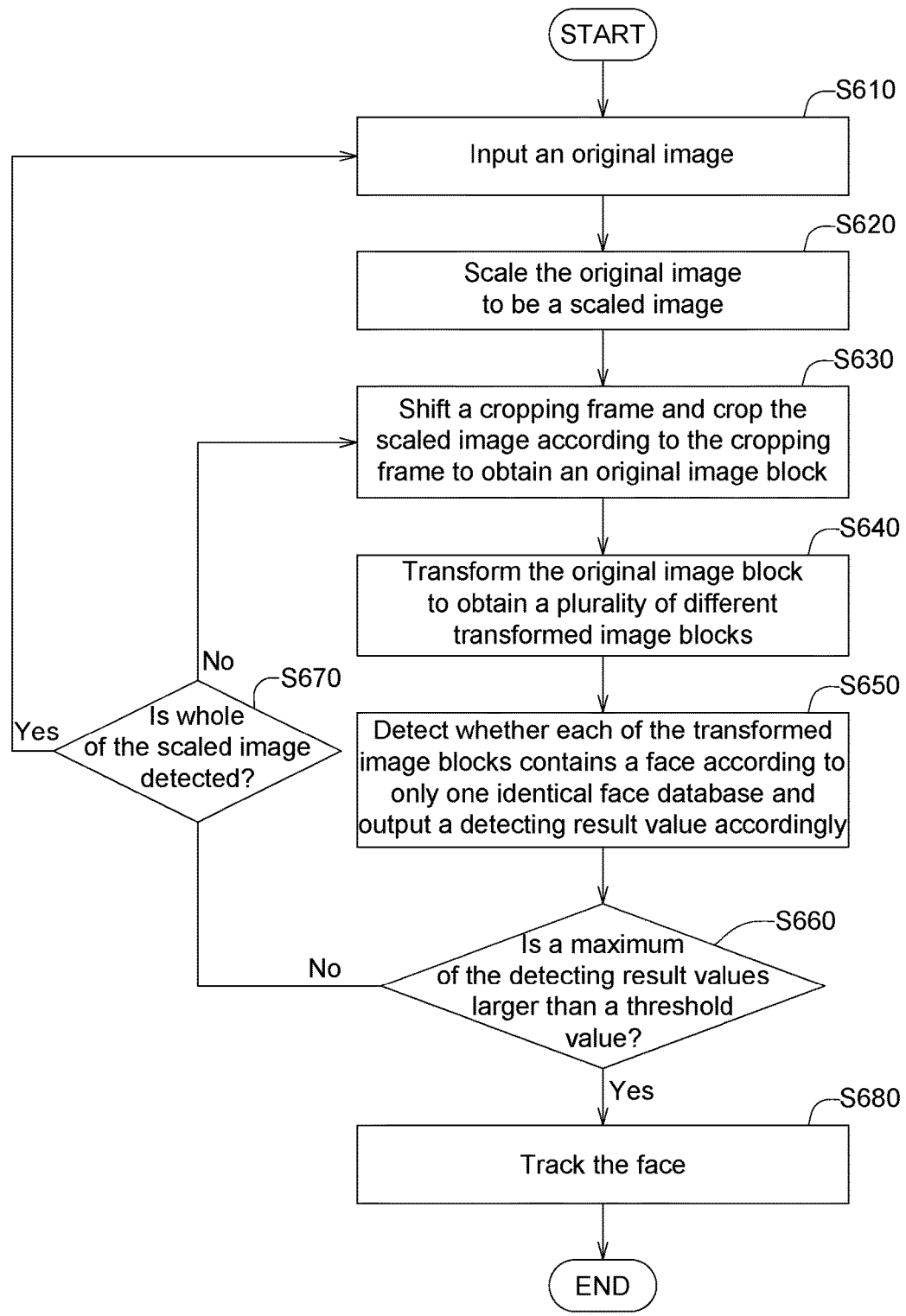
FIG. 7 shows a flowchart of a face detecting method according to another embodiment.
Figure 8:
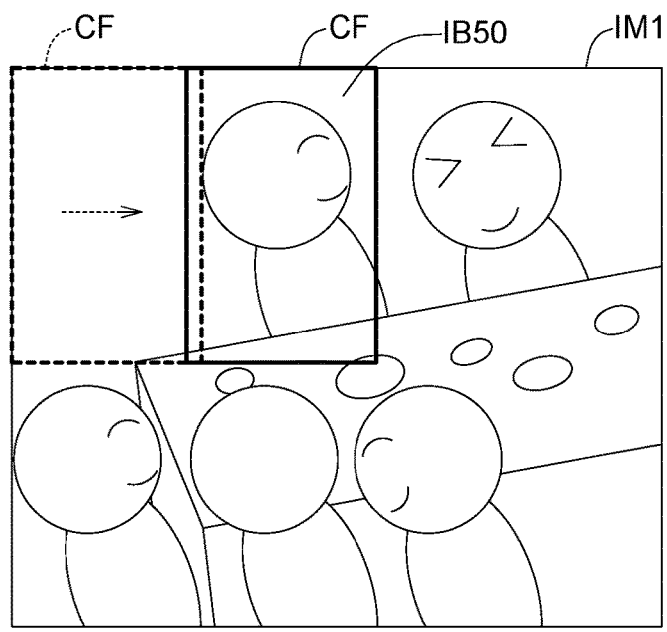
FIG. 8 illustrates the step S620 and step S630 of FIG. 6.

In one embodiment, the face detecting method can be used in tracking a focus of a camera. Please refer to FIGS. 6 to 8. FIG. 6 shows a face detecting system 500 according to another embodiment, FIG. 7 shows a flowchart of a face detecting method according to another embodiment, and FIG. 8 illustrates the step S620 and step S630 of FIG. 7. In this embodiment, the face detecting method is used for tracking a focus of a camera. The face detecting system 500 includes a transforming unit 510, a detecting unit 520, only one identical face database 530, a scaling unit 540, a cropping unit 550 and a tracking unit 560. The scaling unit 540 is used for performing some scaling procedures, such as an enlarging procedure or a narrowing procedure.

For example, the scaling unit 540 may be a circuit, a chip, a circuit board, a storage device storing a plurality of program codes. The cropping unit 550 is used for performing some cropping procedures. For example, the cropping unit 550 may be a circuit, a chip, a circuit board, a storage device storing a plurality of program codes. The tracking unit 560 is used for performing some cropping procedures. For example, the tracking unit 560 may be a circuit, a chip, a circuit board, a storage device storing a plurality of program codes. In one embodiment, all or some of the transforming unit 510, the detecting unit 520, the scaling unit 540, the cropping unit 550 and the tracking unit 560 may be integrated into one piece.

In step S610 of FIG. 7, referring to FIG. 6, an original image IM0 is inputted. Then, in step S620 of FIG. 7, referring to FIGS. 6 and 8, the original image IM0 is scaled to be a scaled image IM1 having a particular size.

In step S630 of FIG. 7, referring to FIGS. 6 and 8, a cropping frame CF is shifted and the scaled image IM1 is cropped according to the cropping frame CF to obtain an original image block IB50.

Then, in step S640 of FIG. 7, referring to FIG. 6, the original image block IB50 is transformed by the transforming unit 510 to obtain a plurality of different transformed image blocks IB51-IB58.

Afterwards, in step S650 of FIG. 7, referring to FIG. 6, whether each of the transformed image blocks IB51 to IB58 contains a face is detected according to the only one identical face database 530 by a plurality of parallel processing cores 521, 522, . . . , 528 of the detecting unit 520, and detecting result values RS51, RS52, . . . , RS58 are outputted accordingly.

In step S660, whether a maximum of the detecting result values RS51, RS52, . . . , RS58 is larger than a threshold value is determined by the determiner 529. If the maximum of the detecting result values RS51-RS58 is larger than the threshold value, then the process proceeds to the step S680; if the maximum of the detecting result values RS51-RS58 is not larger than the threshold value, then the process proceeds to the step S670.

In step S670 of FIG. 7, whether whole of the scaled image IM1 is detected is determined by the cropping unit 550. If some portions of the scaled image IM1 are not detected, then the process returns to step S630 to shift the cropping frame CF and crop the scaled image IM1 to obtain another original image block (not shown). That is to say, the step S630 of cropping, the step S640 of transforming and the step S650 of detecting will be continuously performed until a face is detected.

If whole of the scaled image IM1 is detected, then the process returns to step S610 to input another original image (not shown). That is to say, the step S610 of inputting, the step S620 of scaling, the step S630 of cropping, the step S640 of transforming and the step S650 of detecting will be continuously performed until a face is detected.

In step S680 of FIG. 7, the face is tracked by the tracking unit 560, such that the focus of the camera can be moved following the face to clearly shoot the face.

Figure 9:
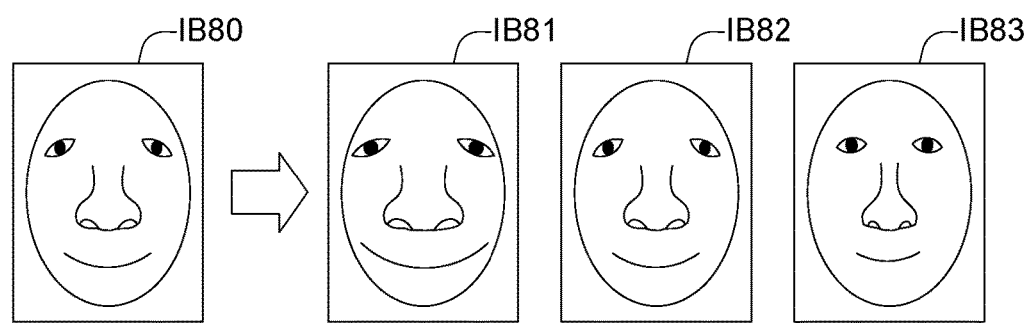
FIG. 9 illustrates an affine transformation procedure.

In another embodiment, the transforming unit 110 (or 510) is an affine processor and the step S220 (or step S640) can be performed by an affine transformation procedure (or a distortion transformation procedure). Please refer to FIG. 9, which illustrates the affine transformation procedure. An original image block IB80 can be transformed by the affine functions to obtain a plurality of transformed image blocks IB81, IB82 and IB83. In this embodiment, the original image block IB80 is captured by a fisheye lens or an ultra wide-angle lens, the original image block IB80 is distorted. By transforming the original image block IB80, an undistorted face can be obtained in the transformed image block IB81. Therefore, only one face database is needed in the face detecting method. The training procedures of other face databases can be omitted and the storage space can be saved.

Figure 10:
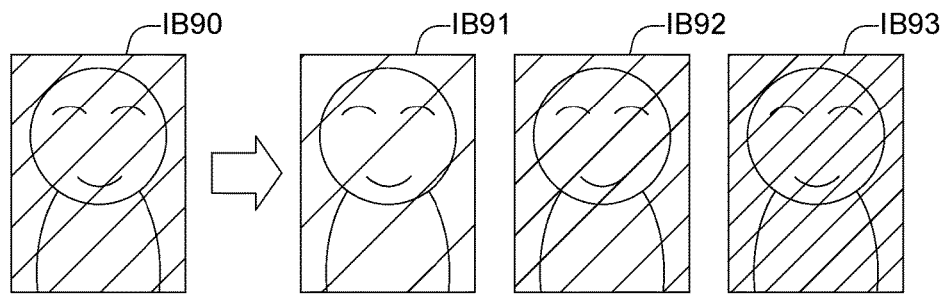
FIG. 10 illustrates a luminosity adjustment procedure.

In another embodiment, the transforming unit 110 (or 510) is an adjuster and the step S220 (or step S640) can be performed by a luminosity adjustment procedure, a contrast ratio adjustment procedure or a chromaticity adjustment procedure. Please refer to FIG. 10, which illustrates the luminosity adjustment procedure. An original image block IB90 can be transformed by the luminosity adjustment procedure to obtain a plurality of transformed image blocks IB91, IB92 and IB93. In the transformed image block IB91, the luminosity is increased. In the transformed image block IB92, the luminosity is not changed. In the transformed image block IB93, the luminosity is decreased. By transforming the original image block IB90, a clear face can be obtained in the transformed image block IB91. Therefore, the accuracy of the detecting procedure can be increased.

Figure 11:
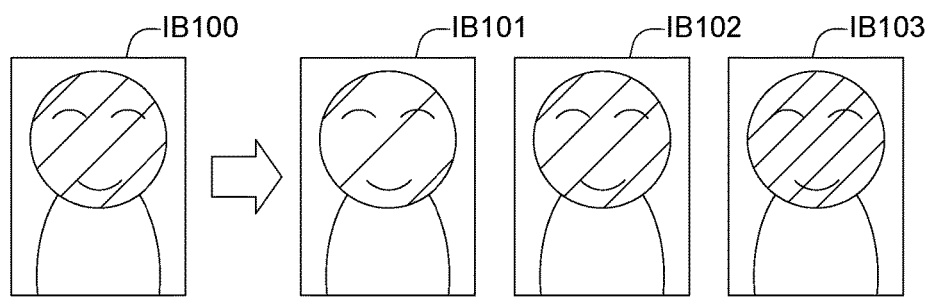
FIG. 11 illustrates a skin color adjustment procedure.

In another embodiment, the transforming unit 110 (or 510) is an adjuster and the step S220 (or step S640) can be performed by a skin color adjustment procedure. Please refer to FIG. 11, which illustrates the skin color adjustment procedure. An original image block IB100 can be transformed by the skin color adjustment procedure to obtain a plurality of transformed image blocks IB101, IB102 and IB103. In the transformed image block IB101, the skin color is increased. In the transformed image block IB102, the skin color is not changed. In the transformed image block IB103, the skin color is decreased. By transforming the original image block IB100, a clear face can be obtained in the transformed image block IB101. Therefore, the accuracy of the detecting procedure can be increased.

Moreover, in another embodiment, the step S220 (or step S640) can be performed by at least two difference procedures to obtain a clear full-frontal face.

Figure 12:
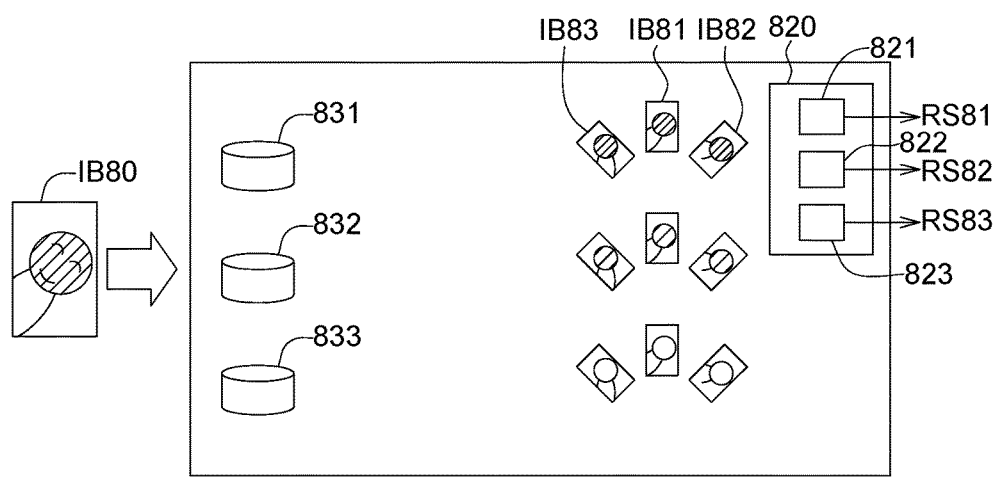
FIG. 12 shows a parallel process for the face detecting method according to another embodiment.

Refer to FIG. 12, which shows a parallel process for the face detecting method according to another embodiment. In one embodiment, the parallel process may be used with a plurality of face database 831, 832, 833, not limited to 3 face databases. For example, the face database 831 is a black skin face database, the face database 832 is a yellow skin face database, and the face database 833 is a white skin face database. When an original image block IM0 is captured from Africa, the face database 831, may be used. Those original image block IB80 is transformed to be the transformed image blocks IB81 to IB83 and then the transformed image blocks IB81 to IB83 are detected to find a face. In the face detecting method, the time consumption of the step of detecting is larger than the time consumption of the step of transforming. For reducing the time consumption, the step of detecting the transformed image block IB81 to IB83 can be respectively performed by a plurality of parallel processing cores 821 to 823 of a detection unit 820 at the same time, and detecting result values RS81, RS82 and RS83 can be outputted accordingly. Therefore, the processing efficiency can be greatly improved.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A face detecting method, comprising:
 receiving at least one original image block;
 transforming, by a transforming unit, the original image block to obtain a plurality of different transformed image blocks, wherein the transforming unit rotates the original image block to obtain the different transformed image blocks;
 detecting whether each of the transformed image blocks contains a face according to only one face database, wherein the transformed image blocks are detected by a plurality of parallel processing cores of a detecting unit at the same time, and detecting result values are respectively outputted from the parallel processing cores;
 determining, by a determiner, whether a maximum of the detecting result values is larger than a threshold value; and
 if the maximum of the detecting result values is larger than the threshold value, then the determiner deems that the original image block contains a face.

2. The face detecting method according to claim 1, wherein
 the transforming unit rotates the original image block, by taken a center point of the original image block as a rotation axis, at a plurality of different degrees to obtain the different transformed image blocks.

3. The face detecting method according to claim 2, wherein the transforming unit rotates the original image block at (360/N)*i degrees to obtain N different transformed image blocks, N is a positive integer which is larger than 2, and i is a positive integer from 0 to N.

4. The face detecting method according to claim 1, wherein
the transmitting unit transforms the original image block by a plurality of different affine functions to obtain the transformed image blocks.

5. The face detecting method according to claim 1, wherein
the transforming unit adjusts a luminosity, a contrast ratio, a chromaticity or a skin color of the original image block at a plurality of different setting values to obtain the different transformed image blocks.

6. The face detecting method according to claim 1, wherein the transformed image blocks are respectively detected by the parallel processing cores of the detecting unit at the same time.

7. A face detecting system, comprising:
a transforming unit for transforming at least one original image block to obtain a plurality of different transformed image blocks, wherein the transforming unit includes a rotator for rotating to obtain the different transformed image blocks;
only one face database; and
a detecting unit including:
a plurality of parallel processing cores, wherein the parallel processing cores are used for detecting whether each of the transformed image blocks contains a face according to the only one identical face database and respectively outputting detecting result values; and
a determiner for determining whether a maximum of the detecting result values is larger than a threshold value, wherein if the maximum of the detecting result values is larger than the threshold value, then it is deemed that the original image block contains a face.

8. The face detecting system according to claim 7, wherein
the rotator is for rotating, by taken a center point of the original image block as a rotation axis, the original image block at a plurality of different degrees to obtain the different transformed image blocks.

9. The face detecting system according to claim 8, wherein the rotator respectively rotates the original image block at (360/N)*i degrees to obtain N different transformed image blocks, N is a positive integer which is larger than 2, and i is a positive integer from 0 to N.

10. The face detecting system according to claim 7, wherein
the transforming unit is an affine processor for transforming the original image block by a plurality of different affine functions to obtain the different transformed image blocks.

11. The face detecting system according to claim 7, wherein
the transforming unit is an adjuster for adjusting a luminosity, a contrast ratio, a chromaticity or a skin color of the original image block at a plurality of different setting values to obtain the different transformed image blocks.

12. The face detecting system according to claim 7, wherein the parallel processing cores of the detecting unit are used for respectively detecting the transformed image blocks are at the same time.

* * * * *